July 18, 1950        E. H. REMDE        2,516,074

STEERING MECHANISM FOR VEHICLES

Filed Aug. 5, 1947        4 Sheets-Sheet 1

INVENTOR.
EDWARD H. REMDE
BY
ATTORNEY.

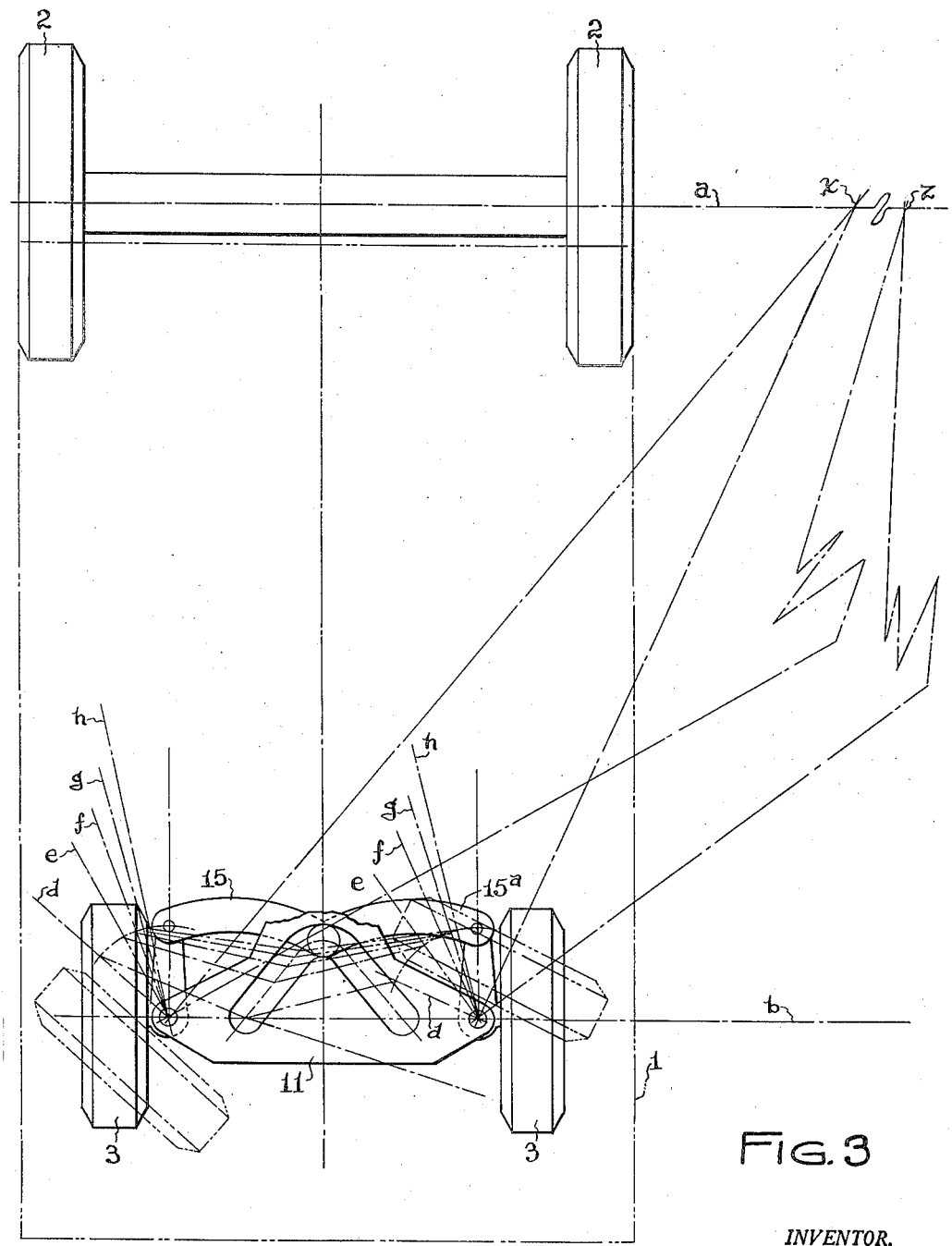

July 18, 1950     E. H. REMDE     2,516,074
STEERING MECHANISM FOR VEHICLES
Filed Aug. 5, 1947     4 Sheets-Sheet 3

INVENTOR.
EDWARD H. REMDE
BY
Geo. B. Pitts
ATTORNEY.

July 18, 1950            E. H. REMDE            2,516,074
STEERING MECHANISM FOR VEHICLES
Filed Aug. 5, 1947            4 Sheets-Sheet 4
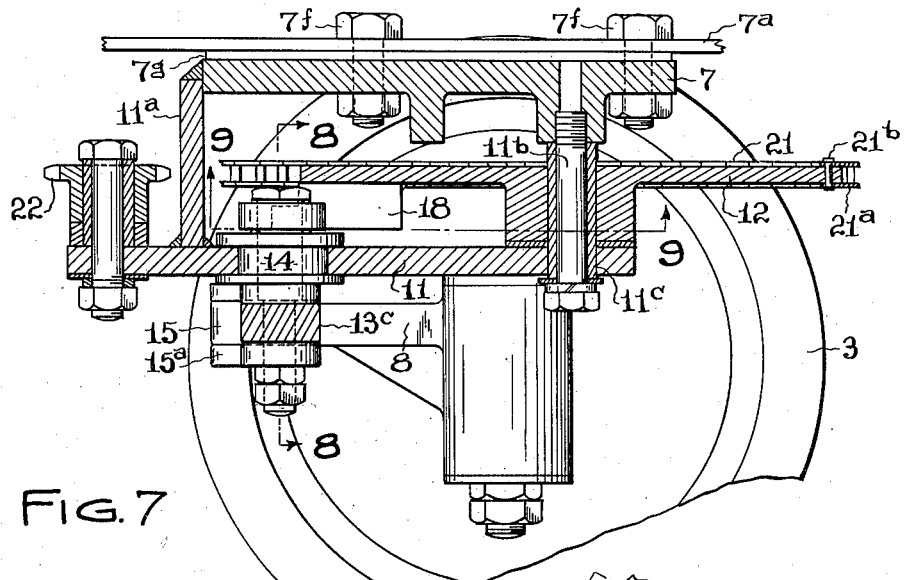
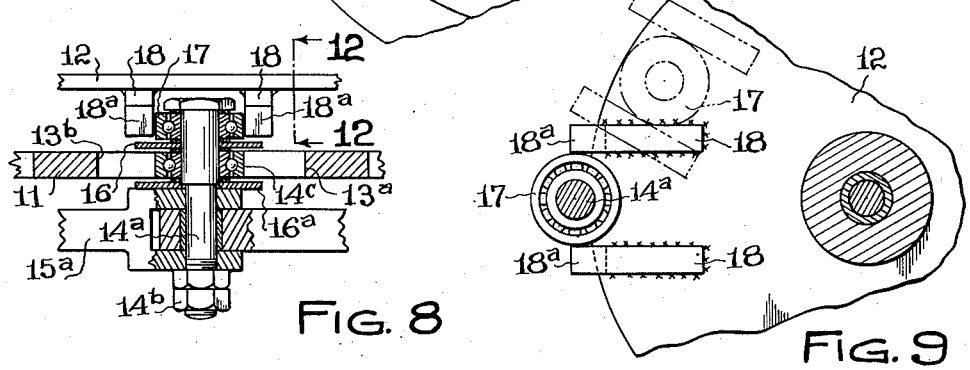
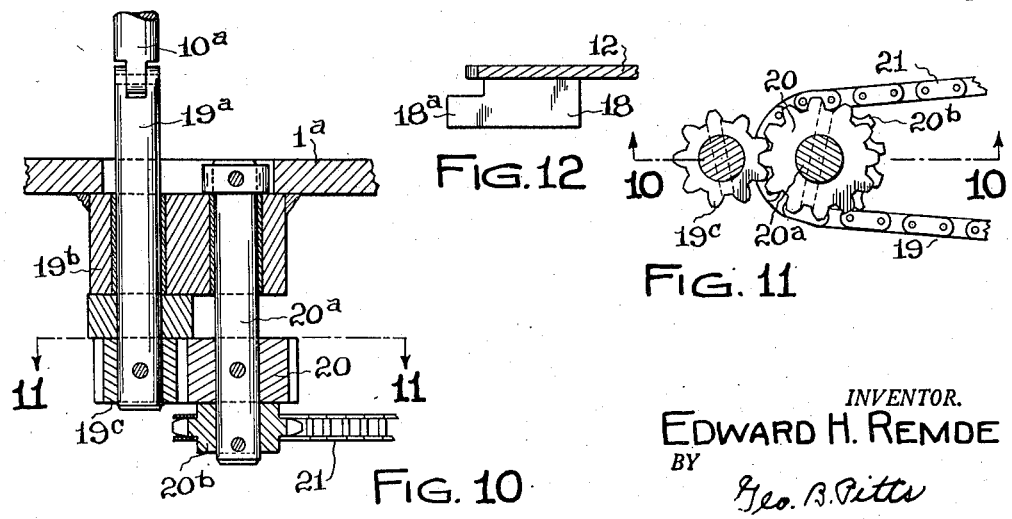
INVENTOR.
EDWARD H. REMDE
BY
Geo. B. Pitts
ATTORNEY Patented July 18, 1950

2,516,074

UNITED STATES PATENT OFFICE 2,516,074

STEERING MECHANISM FOR VEHICLES

Edward H. Remde, Cleveland, Ohio, assignor to The Baker-Raulang Company, Cleveland, Ohio, a corporation of Ohio Application August 5, 1947, Serial No. 766,389

7 Claims. (Cl. 280—95)

This invention relates to vehicles having dirigible steering wheels, more particularly to the steering gear mechanism therefor. The invention is particularly applicable to motor driven vehicles.

In all vehicles employing a pair of steerable dirigible wheels, of which I have knowledge, steering of the vehicle along curvilinear paths has caused slippage between the treads of the tires and the pavement or road in directions at angles to the plane of each wheel, the effect of which has been to cause wear on the tire treads, stresses on the wheel mountings as well as wear of the pavement or road due to the fact that when the dirigible wheels are operated about their respective trunnions or steering knuckles, they as well as the other supporting wheels for the vehicle do not traverse paths concentric to a common center, and obviously such wear is increased in proportion to the weight of the vehicle and its load. Also, greater wear takes place on the tires of vehicles having shortened wheel bases and/or narrowed treads as compared to tires on vehicles having long bases and/or wide treads.

One object of the invention is to provide an improved steering mechanism for a wheel mounted vehicle wherein wear on the wheel tires due to slippage thereof in steering the vehicle is eliminated.

Another object of the invention is to provide in a vehicle having dirigible supporting wheels improved connections between them for swinging the wheels about their respective knuckles into different angular relation, whereby the wheels traverse paths about a common center to effect steering of the vehicle.

Another object of the invention is to provide in a vehicle having one or more non-dirigible supporting wheels and a pair of dirigible supporting wheels, improved connections between the latter wheels for swinging them about their respective knuckles into different angular relation, whereby the dirigible wheels and non-dirigible wheels traverse paths about a common center during turning movements of the vehicle.

Another object of the invention is to provide in a vehicle or truck having a pair of dirigible supporting wheels, an improved compensating or differential mechanism connected to and operable to swing the dirigible wheels into different angular positions relative to their normal axes for steering the vehicle or truck, whereby in each steering position these wheels traverse paths about a common center.

Another object of the invention is to provide in a vehicle having a pair of dirigible supporting wheels at one end of the vehicle and a non-dirigible supporting wheel or wheels at the opposite end thereof, improved connections between the dirigible supporting wheels and related to the axis of the non-dirigible supporting wheel or wheels, operable to swing the dirigible wheels into various steering positions, whereby all of the supporting wheels, in each steering position traverse paths about a common center.

A further object of the invention is to construct a vehicle having a pair of dirigible steering wheels and an improved steering mechanism of simplified construction for the wheels adapted to position them in any steering position to traverse curvilinear paths about a common center.

Other objects of the invention will be apparent to those skilled in the art to which my invention relates from the following description taken in connection with the accompanying drawings, wherein Fig. 1 is a side elevation of a vehicle embodying my invention, parts being broken away and partly in section on the line 1—1 of Fig. 2.

Fig. 3 is a diagrammatic view showing different steering positions of the dirigible wheels and the respective centers about which the wheels traverse in steering the vehicle.

Fig. 7 is a fragmentary section on the line 1—1 of Fig. 2, enlarged.

Figure 2:
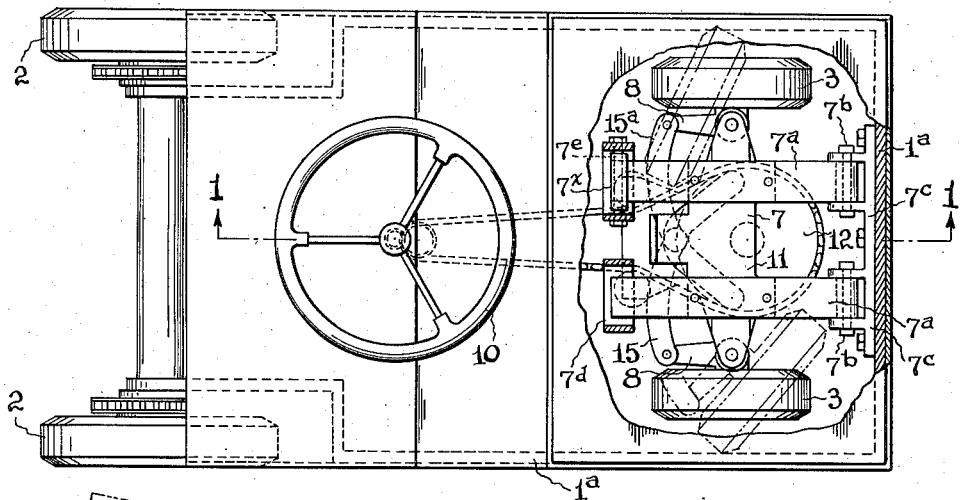
Fig. 2 is a plan view, partly in section on the line 2—2 of Fig. 1.

Figs. 8 and 9 are sections on the lines 8—8 and 9—9, respectively, of Fig. 7.

Fig. 10 is a section on the line 10—10 of Fig. 11.

Fig. 11 is a section on the line 11—11 of Fig. 10.

Fig. 12 is a section on the line 12—2 of Fig. 7.

In the drawings, 1 indicates as an entirety a vehicle embodying a steering gear mechanism as hereinafter set forth. The vehicle 1 shown for illustrative purposes is of the industrial type having a pair of power driven wheels 2, dirigible steering wheels 3 and a suitable elevating mechanism 4. In the arrangement shown the wheels 2, adjacent the elevating mechanism 4 are nonsteerable and adapted to be power driven in any suitable manner, the driving means herein shown consisting of a differential mechanism 4a, and a jack shaft 4b drivingly connected through endless chains 4c to the wheels 2, respectively, (the power supply and connections therefrom to the differential mechanism 4a are not shown); also, the driver's station 5 is adjacent to and faces the elevating mechanism 4, so that the wheels 2 may be referred to as the front wheels and the wheels 3 may be referred to as the rear wheels. It is to be observed that in industrial trucks it is the practice to provide dirigible steering wheels at either end of the truck irrespective of whether it embodies an elevating mechanism and also to position the driver's station remotely from the elevating mechanism or what may be termed the front end of the truck. Since the improved steering gear herein disclosed is applicable to all wheel mounted vehicles and vehicles having front or rear steerable wheels, such disclosure is merely illustrative of the preferred application of the invention.

The wheels 3 are mounted on suitable spindles 3a, having knuckles pivoted on pins 6 mounted in the opposite ends of the axle 7 and integrally connected steering arms 8 preferably extending rearwardly relative to the axle 7 and laterally at right angles to the spindles 3a. The upper end portion of each pin 6 is secured by a set screw 6a to the axle to prevent turning thereof, whereas its lower end is reduced and threaded to take nuts 6b, which through a washer engage the lower end of the adjacent spindle knuckle to connect the latter to the axle. The axle 7 may be connected to the vehicle frame 1a rigidly or by springs in any well known manner, but the connection herein shown consists of a pair of spring members 7a each pivotally mounted at its outer end on a pin 7b, which is supported in a bracket 7c suitably fixed to the adjacent end bar of the frame 1a. The spring members 7a extend inwardly, their inner end portions being endwise slidably supported on the bottom walls of cradles 7d to permit flexing of the members. The side walls of each cradle support a shaft 7e for a roller 7x which engages the adjacent spring member and maintains it in slidable engagement with the bottom wall of the adjacent cradle. Intermediate their pivotal connections through the bracket 7c with the frame 1a and support in the cradles 7d, the spring members 7a are rigidly connected to the axle 7 by bolts 7f. A spacer 7g is preferably disposed between the spring members 7a and axle 7.

9 indicates as an entirety a differential or compensating mechanism connected to the arms 8 and arranged, upon operation of a steering wheel 10 during vehicle travel, simultaneously to swing the wheels 3 from normal position (that is, that position in which the vehicle may be driven in a rectilinear direction) in either direction into different angular positions, whereby the wheels 3 traverse arcuate paths about a common center, which center in any operated position of the wheels is intersected by an imaginary line a extending parallel to the normal axis of the wheels 3, shown at b (Fig. 3). By preference, the mechanism 9 is related to the axis of the wheels 2, as later set forth, that is, the imaginary line a is co-incident with the axis about which the wheels 2 rotate. Accordingly, in any turning movement of the vehicle, due to operation of the wheel 10, all four wheels 2, 3, will traverse paths about a common center.

While the range of swinging movement of the wheels 3 about their respective pins 6 relative to centers on the axis a (see Fig. 3) may vary, as it is customary in maneuvering turns to decrease or increase the vehicle turning radius and in bringing the vehicle into a forward or backward straight direction of travel, such variations in the steering operation will obviously move the common center for the wheels 2, 3, along the imaginary axis a, in one direction or the other, dependent on the direction of swinging movement of the wheels 3 and their angular relation to the axis b, so that during any right or left turning movement of the vehicle on a radius or varying radii, the wheels 2, 3, will always traverse paths about a common center or centers which lie in the axis a.

Figure 6:
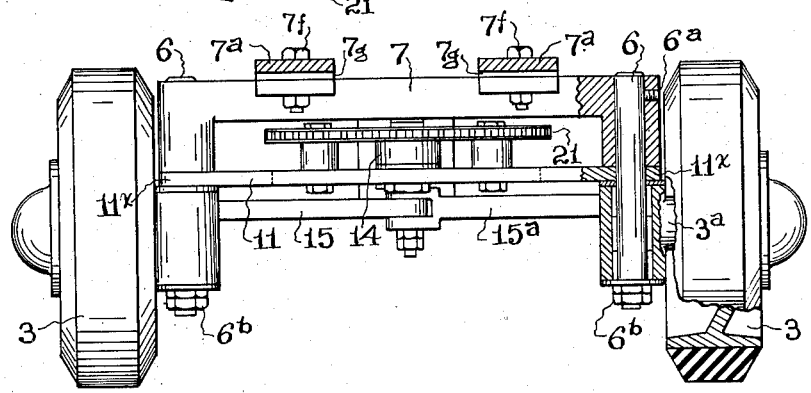
Fig. 6 is a view looking upwardly in Fig. 4, partly in section on the line 6—6 of said view, enlarged.

The differential mechanism 9 comprises the following: 11 indicates a support, the inner end portion of which is rigidly connected by a transverse, vertically disposed wall 11a to the rear side edge of the axle 7, the wall 11a being welded along its upper and lower edges to the axle 7 and support 11. The opposite end portion of the support 11 is connected to the axle 7 by a bolt 11b, threaded into an opening formed in the axle 7, the head of the bolt having engagement with the lower face of the support 11. The opposite sides of the support 11 are preferably provided with lateral extensions 11x disposed between the axle and wheel knuckles (see Fig. 6) and formed with openings through which the pins 6 extend, whereby the knuckles and the wall 11a serve to support the support 11 below the axle 7 in a plane above that in which the arms 8 swing when the latter are operated to steer the vehicle. The bolt 11b is surrounded by a bushing 11c, the opposite ends of which engage the bolt head and axle 7. In this arrangement the bolt 11b also serves as a shaft for an operating member 12, which, for reasons later apparent, consists of a disk and is rotated in either direction in the manner later set forth.

13 indicates a continuous guide of substantially V-shape formed in the support 11, the legs 13a, 13b, of the guide forming guide ways preferably extending rectilineally from the apex c of the guide and connected at their inner ends, inwardly of the apex c, by a curvilinear portion 13c in which a connector 14 (later referred to) is normally positioned, when the wheels 3 are in normal position, for movement endwise of either guide way dependent on the curvilinear direction in which the vehicle is to be steered. It will be observed that the angular relation of the guide ways 13a, 13b, is generated from centers on an imaginary axis which is co-incident with the imaginary axis a for the wheel or wheels at that end of the frame remote from the steerable wheels, and such relation will vary dependent on the wheel base of the vehicle and the treads of the front and rear wheels thereof. The vehicle shown in the present disclosure has a wheel base of 36 inches, the tread of the wheels 2 is 26 inches and the tread of the wheels 3 is 22 inches; in this arrangement, the guide ways 13a, 13b, are disposed at a 90 degree angle, generated from centers on the imaginary axis a (two centers x, z, being shown in Fig. 3), at either side of the longitudinal axis a' of the frame 1a. Fig. 3 shows the wheels 3 in position, indicated by lines d—d, to effect traverse thereof and the wheels 2 on paths about the center x, to steer vehicle to the right, and lines e—e indicate the position of the wheels 3 when positioned for steering to the right about the center $z$; lines $f$—$f$, $g$—$g$ and $h$—$h$ indicate other steering positions for the wheels 3 for traverse thereof and wheels 2 about centers on the axis $a$.

Figure 4:
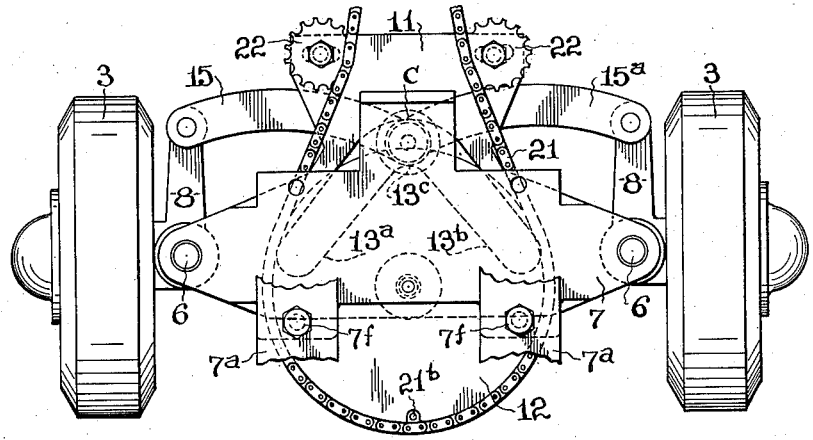
Fig. 4 is a fragmentary plan view of parts shown in Fig. 2, enlarged.
Figure 5:
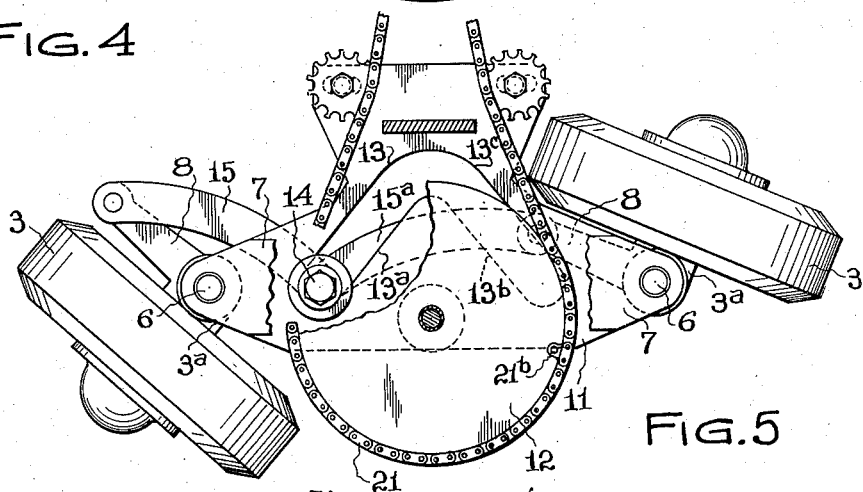
Fig. 5 is a view similar to Fig. 4, but showing the wheels in one steering position, parts being broken away.

15, 15a indicate links connected at their outer ends to the arms 8, the inner ends of the links being pivotally connected together by the connector 14. By preference the links 15, 15a are of equal length, in which arrangement the apex $c$ is disposed midway the wheels 3 and as the arms 8 extend inwardly relative to the axle 7, the guide ways 13a, 13b, extend in the opposite direction relative to the apex $c$. As shown in Figs. 7, 8 and 9, the connector 14 consists of the following: 14a indicates a bolt extending through the guide 13, the lower portion of the bolt being reduced and extending through alined openings formed in the inner ends of the links 15, 15a, and provided on its lower end with nuts 14b which cooperate with the arms 8 to support the links. Intermediate its ends the bolt 14a is provided with an anti-friction bearing 14c, the inner race of which has a pressed-on engagement with the bolt 14a, whereas the outer race of the bearing has rolling engagement with side walls of the guide 13. Above and below the bearing 14c, the bolt 14a is provided with annular elements 16, 16a, which loosely engage the bolt, and slidably engage the opposite faces of the support 11 during movement of the connector 14 through the guide. The lower element 16a is interposed between the support 11 and the end portion of one of the links 15, 15a whereas the upper element 16 is interposed between the support 11 and an anti-friction ball bearing 17 seated against the head of the bolt 14a. In this arrangement, the annular elements 16, 16a, serve to maintain the bearing 14c in the plane of the support 11 during movement of the connector 14 in and through the guide 13. 18, 18, indicate a pair of spaced parallel plates disposed at opposite sides of a radius of the bolt 11b and fixed to and depending from the operating member 12 remote from the bolt. By preference, the plates 18, 18, are disposed adjacent the periphery of the operating member 12 and provided with extensions 18a, which are cut away to clear the adjacent element of the connections, indicated as an entirety at 19, between the wheel 10 and operating member 12. As shown in Figs. 8, 9 and 10, the bearing 17 is disposed between the plates 18, the outer race of the bearing having rolling engagement therewith. In this arrangement, the bearing 17 and plates 18, 18, provide an operating connection between the connector 14 and operating member 12, so that when the latter is rotated in either direction, any desired distance to effect steering of the vehicle, the connector 14 is moved endwise through one of the guide ways 13a, 13b, and the connector 14 in turn, through the links 15, 15a, simultaneously swings the wheels 3 into different angular relation for steering; for example, if the vehicle is to be steered to the right, the operating member 12 is rotated counterclockwise, as viewed in Figs. 4 and 5, whereby the plates 18, 18, through the bearing 17 move the bolt 14a through the guide way 13a and thus, through a thrust movement on the link 15 and a pull on the link 15a, effect a differential swinging movement of the wheels 3. Fig. 5 shows the connector 14 moved to the outer end of the guide way 13a and the wheels 3 swung to their extreme steering position, whereby these wheels and the wheels 2 traverse paths about the center $x$, but it will be obvious that the connector 14 may be moved from its normal position in the guide portion 13c by the operating member 12 varying distances in either guide way to position the wheels 3 in different angular relation for steering the vehicle about various centers on the imaginary axis $a$, dependent upon the required steering conditions.

Figure 1:
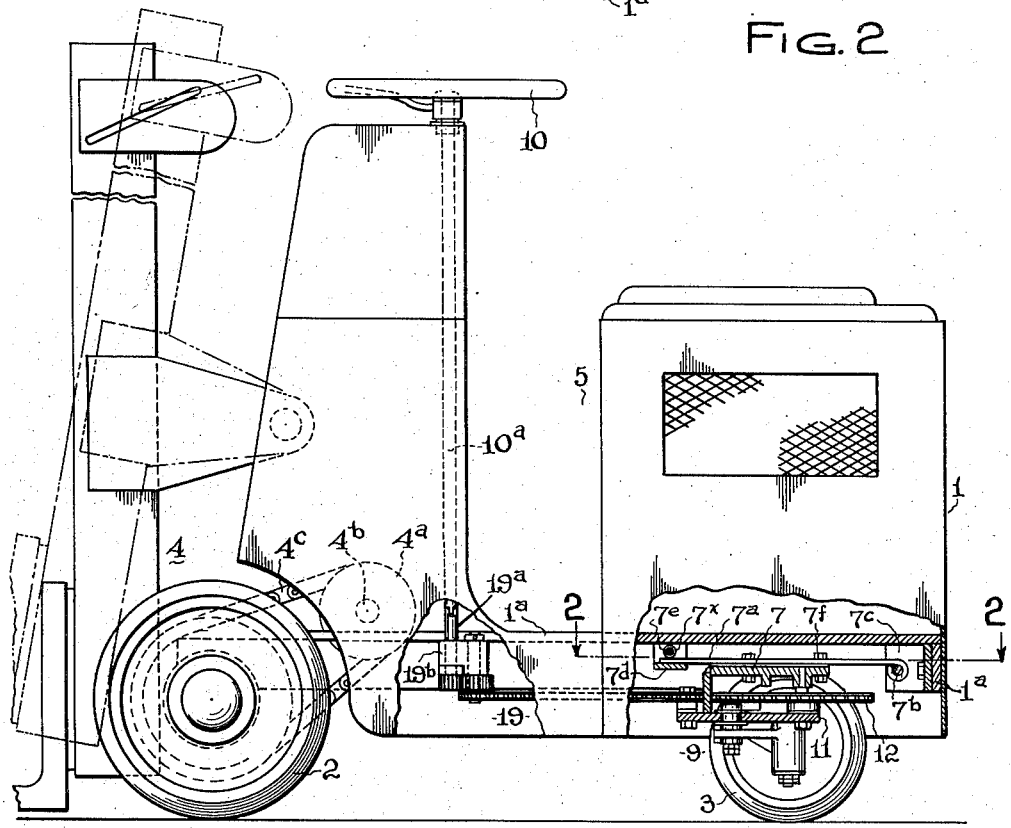

The wheel 10 is fixed to the upper end of a shaft 10a. Any suitable form of connections 19 may be provided between the shaft 10a and the operating member 12 to oscillate or rotate the latter as already set forth, dependent upon the construction of the vehicle and its equipment, as well as the location of the driver's position. In the form of vehicle construction shown, the operating connections consist of the following: 19a indicates a shaft suitably connected to the lower end of the shaft 10a and mounted in a suitable bearing in a wall 19b, which is fixed to the frame 1a. The lower end of the shaft 19a is provided with a pinion 19c in mesh with a gear 20 fixed to a separate shaft 20a, which is mounted in a suitable bearing provided in the wall 19b. Below the gear 20, the shaft 20a is provided with a sprocket 20b, which is engaged by an endless chain 21. The chain 21 extends around the operating member 12 and is preferably connected to the latter diametrically of the plates 18, 18. The connection between the chain 21 and operating member 12 preferably consists of a pair of inwardly extending lugs 21a integral with the side walls of one chain link and a pin 21b extending through alined openings formed in the operating member 12 and lugs 21a. As shown in Fig. 1, the sprocket 20b is disposed in the plane of the operating member 12 and between the latter and the sprocket 20b the runs of the chain 21 engage with and are supported by idler sprockets 22.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a vehicle comprising a frame, front and rear supporting wheels for said frame, spindles for the wheels at one end of said frame mounted to swing on substantially vertical axes and having laterally extending arms, and mechanism for swinging said swingable wheels in either direction from normal position into different angular relation for traverse about a common center to effect steering of the vehicle, said mechanism consisting of a support having substantially fixed relation to said frame and formed with diverging guide ways connected at their inner ends, a pair of links pivotally connected at their outer ends to the outer ends of said arms, a connector pivotally connecting the inner ends of said links together and disposed in the inner connected ends of said guide ways when said swingable wheels are in normal position and movable endwise of either guide way to effect swinging of said swingable wheels, an operating member rotatably mounted on said support on an axis within and in symmetrical relation to said guide ways and operatively connected to said connector for moving it endwise of said guide ways, a movable device on said frame, and operating connections between said device and said operating member for rotating the latter.

2. In a vehicle comprising a frame, front and rear supporting wheels for said frame, spindles for the wheels at one end of said frame mounted to swing on substantially vertical axes and having laterally extending arms, and mechanism for swinging said swingable wheels in either direction from normal position into different angular relation for traverse about a common center to effect steering of the vehicle, said mechanism consisting of a support having substantially fixed relation to said frame and disposed in a plane parallel to that in which said arms swing and formed with diverging guide ways connected together at their inner ends, a pair of links pivotally connected at their outer ends to said arms, a connector pivotally connected at one end to the inner ends of said links and extending through and disposed in the inner connected ends of said guide ways when said swingable wheels are in normal position, an operating member rotatably mounted on said support and disposed in a plane parallel to and on the opposite side of said support from the plane of movement of said arms and operatively connected to the opposite end of said connector for moving it endwise of either guide way to swing said swingable wheels into steering position, a movable device on said frame, and operating connections between said device and said operating member for rotating the latter.

3 A vehicle as claimed in claim 2 wherein said rotatable member is provided with a pair of spaced plates disposed parallel to a radius of said member and having slidable pivotal connection with the said opposite end of said connector.

4. In a vehicle comprising a frame, front and rear supporting wheels for said frame, spindles for the wheels at one end of said frame mounted to swing substantially on vertical axes and having laterally extending arms, and mechanism for swinging said swingable wheels in either direction from normal position into different angular relation for traverse about a common center to effect steering of the vehicle, said mechanism consisting of a support between said swingable wheels and having substantially fixed relation to said frame and formed with a continuous V-shape guide way the legs of which are disposed at an angle of substantially 90 degrees, a pair of links pivotally connected at their outer ends to said arms, a connector pivotally connecting the inner ends of said links together and disposed in the apex portion of said V-shape guide way when said swingable wheels are in normal position, an operating member rotatably mounted on said support and operatively connected to said connector for moving it endwise of either leg of said V-shape guide way to swing said swingable wheels into steering position, a movable device on said frame, and operating connections between said device and said operating member for rotating the latter.

5. In a vehicle comprising a frame, front and rear axles thereon, supporting wheels on said axles, one of said axles consisting of spindles mounted to swing on said frame on substantially vertical axes and having laterally extending arms, and mechanism for swinging said swingable wheels in either direction from normal position into different angular relation for traverse about a common center to effect steering of the vehicle, said mechanism consisting of a support fixed to said frame, a pair of links pivotally connected at their outer ends to said arms, a connector pivotally connecting the inner ends of said links together, a pair of guides on said support for said connector, a member rotatably mounted on said support and provided with spaced plates arranged to slidably and pivotally engage said connector for moving it along either of said guides, contiguous portions of each of said guides being generated on centers common to an imaginary line coincident with the axis of the other axle, whereby the movement of said connector, when moved to any position relative to either of said guides, swings said swingable wheels into different angular relation for traverse on paths concentric to the center related to the position of said connector, a movable device on said frame, and operating connections between said device and said member for rotating the latter.

6. In a vehicle comprising a frame, front and rear axles on said frame, a pair of wheels on one of said axles, spindles for another pair of wheels on the other axle, each spindle being provided with a laterally extending arm, each end of the other axle and the adjacent wheel spindle being provided with pivotally connected knuckles, whereby the pair of wheels on said other axle are swingably mounted, and mechanism for swinging said swingable wheels in either direction from normal position into different angular relation for traverse about a common center to effect steering of the vehicle, said mechanism consisting of a support the opposite end portions of which are disposed between and supported by said pivotally connected knuckles, a link pivotally connected at its outer end to each of said arms, a connector pivotally connecting the inner ends of said links together, a pair of guides on said support for said connector, a vertically disposed shaft mounted on said support midway between the axes on which said swingable wheels swing, a disk rotatably mounted on said shaft and provided on its marginal portion with elements arranged to engage and move said connector along either of said guides, contiguous portions of each of said guides being generated on centers common to an imaginary line parallel to a vertical plane intersecting the axes on which said swingable wheels swing, whereby the movement of said connector, when moved to any position relative to either of said guides, swings said swingable wheels into different angular relation for traverse on paths concentric to the center related to the position of said connector, a movable device on said frame, and operating connections between said device and said disk for rotating the latter.

7. In a vehicle comprising a frame, a pair of supporting wheels at each end of said frame, one of said pairs of wheels being mounted to swing on substantially vertical axes, and mechanism for swinging said swingable wheels in either direction from normal position into different angular relation for traverse about a common center to effect steering of the vehicle, said mechanism consisting of a horizontally disposed support having a substantially fixed relation to said frame and formed with a slot having diverging guide ways connected at their inner ends, a pair of links operatively connected at their outer ends to said swingable wheels, a vertically disposed connector the lower end of which extends through the inner ends of said links for pivotally connecting them together, said connector extending upwardly through said slot and movable horizontally in said guide ways, a pair of annular members on said connector and having sliding engagement with the upper and lower surfaces of said support during movement of said connector in said guide ways, a member rotatably mounted on said support and provided with devices having engagement with the upper end of said connector, a movable device on said frame, and operating connections between said device and said member for rotating the latter.

EDWARD H. REMDE.

REFERENCES CITED

The following references are of record in the file of this patent:

UNITED STATES PATENTS

| Number | Name | Date |
|---|---|---|
| 2,411,570 | Hawkins | Nov. 26, 1946 |

FOREIGN PATENTS

| Number | Country | Date |
|---|---|---|
| 341,053 | France | May 30, 1904 |
| 351,307 | Germany | Apr. 5, 1922 |